United States Patent

Sekida

[15] 3,646,868
[45] Mar. 7, 1972

[54] MECHANISM FOR OPERATING THE REFLECTING MIRROR IN A SINGLE-LENS REFLEX CAMERA

[72] Inventor: Minoru Sekida, Sakai-shi, Osaka, Japan
[73] Assignee: Minolta Camera Kabushiki Kaisha, Osaka, Japan
[22] Filed: July 25, 1969
[21] Appl. No.: 844,749

[30] Foreign Application Priority Data

Aug. 1, 1968 Japan..................................43/65993

[52] U.S. Cl..............................................................95/42
[51] Int. Cl..........................................................G03b 19/12
[58] Field of Search......................................................95/42

[56] References Cited

UNITED STATES PATENTS 3,221,626  12/1965  Fuketa......................................95/42
3,468,232  9/1969   Knapp.......................................95/42
3,474,715  10/1969  Nakamura.................................95/42
3,507,199  4/1970   Sato..........................................95/42

Primary Examiner—John M. Horan
Assistant Examiner—Michael Harris
Attorney—Watson, Cole, Grindle & Watson

[57] ABSTRACT

A mechanism for operating the reflecting mirror in a single-lens reflex camera wherein a pair of interconnected levers are so articulated as to be angularly related during other than an uppermost position of the pivotally mounted mirror, and be coaxial during an uppermost position of the mirror. One of the levers has a slot therein opening toward its free end for the reception of a pin member secured to the mirror, and a spring is provided on this one lever for urging the pin toward the bottom of the slot. The levers are so arranged that the pin is slightly spaced from the bottom of the slot to thereby increase the spring tension in the lowermost position of the mirror resting against a stop means, whereby the frame is moved upwardly as the residual tension of said spring is lessened and permits the pin to be moved closer toward the slot bottom until it makes contact therewith in the uppermost position.

2 Claims, 6 Drawing Figures

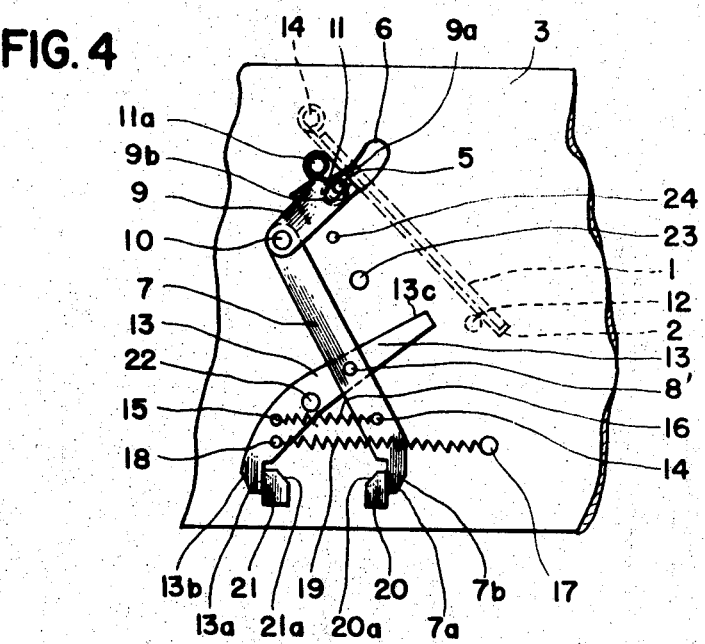
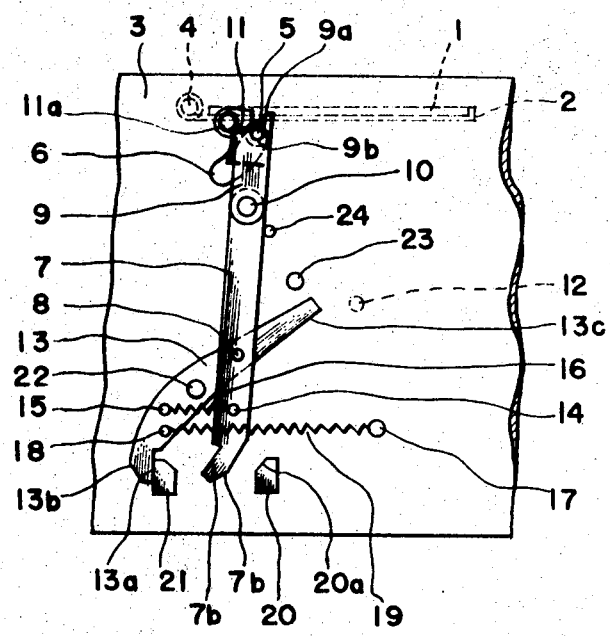

3,646,868

MECHANISM FOR OPERATING THE REFLECTING MIRROR IN A SINGLE-LENS REFLEX CAMERA

BACKGROUND OF THE INVENTION

In the single-lens reflex camera, as well as in other known types of cameras, its mirror must be capable when photographing of quickly moving from its viewing position at an angle of 45° to the optical axis of the objective lens to its position parallel with the optical axis in the photographing situation. However when the mirror stops at its position parallel with the optical axis the inertia of the turning mirror jars the camera. Also, when the mirror reaches its position at an angle of 45° to the optical axis in the viewing situation, failure to maintain this position results in a condition of parallax between the object to be photographed and the object to be viewed so that it becomes necessary to provide a means for maintaining the correct position at an angle of 45° to the optical axis.

SUMMARY OF THE INVENTION

In order to obviate the drawbacks mentioned above, the present invention is so constructed that a pin provided on a mirror frame pivoted rotatably on the sidewall of a mirror box is projected out of said mirror box, and on said sidewall of said mirror box under said pin there is provided rotatably an operation lever, the upper end of said operation lever being connected in the form of a link to the lower end of a connecting arm provided with a notched slot in which said pin provided on said mirror frame is fitted and pressed to contact with the bottom of said notched slot by means of a spring provided on said connecting arm.

The primary object of the present invention is to reduce a shock to the mirror as far as possible when the mirror in the viewing situation is turned to the photographing situation.

The second object of the present invention is to assure of holding the mirror in the position at the given angle of about 45° to the optical axis of the photographic lens when the mirror is in the viewing condition.

The third object of the present invention is to be so constructed that said holding the mirror in the position at the given angle in the viewing situation is attained by means of a spring provided on the connecting arm connecting the operation lever for the mirror to the mirror, so as not to be in the way when the mirror turns from the viewing situation to the photographing situation.

BRIEF DESCRIPTION OF THE DRAWINGS

FIG. 4 is a side view showing a driving mechanism and a quick return mechanism for the mirror in the viewing condition.

FIG. 5 is a side view similar to FIG. 4 showing the photographing position of the mirror.

DESCRIPTION OF THE PREFERRED EMBODIMENT

Figure 1:
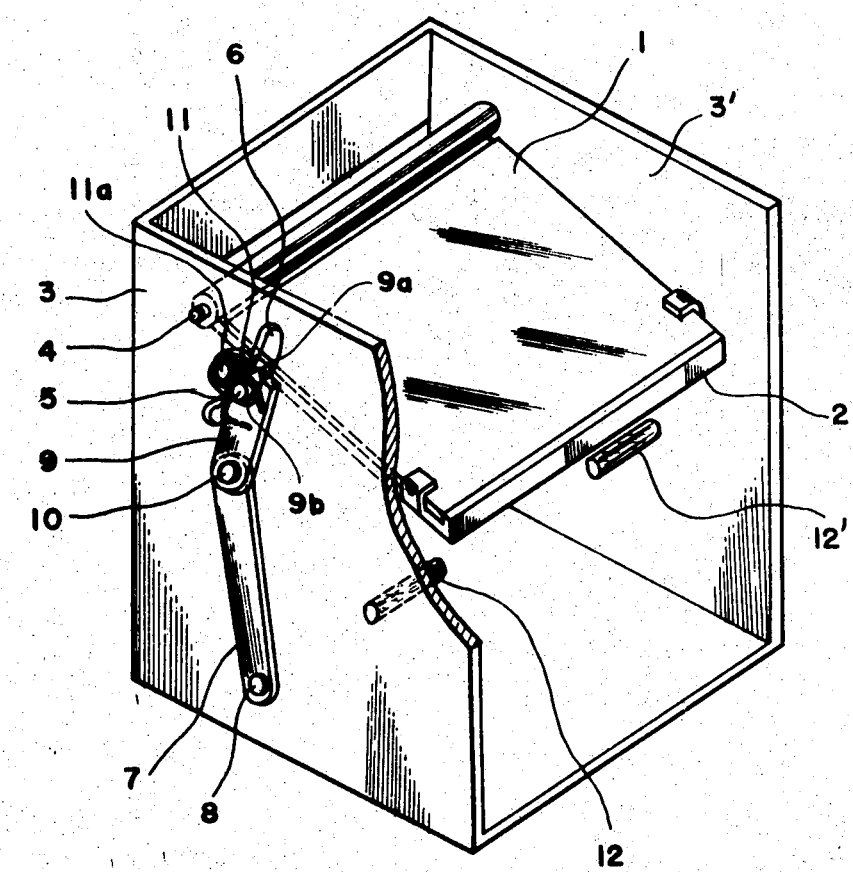
FIG. 1 is a perspective view showing the disposition of essential parts of an embodiment in accordance with the present invention.
Figure 2:
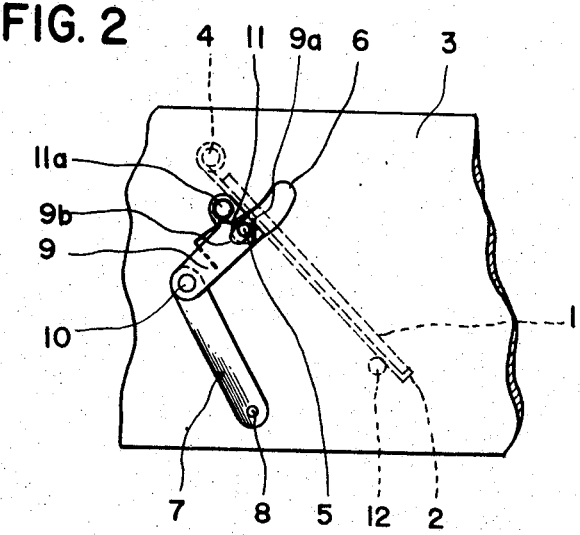
FIG. 2 is a side view of the embodiment shown in FIG. 1, in the viewing situation.
Figure 3:
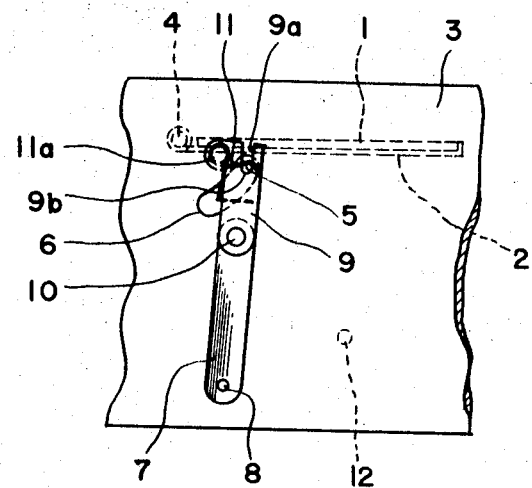
FIG. 3 is a side view of the embodiment shown in FIG. 1, in the photographing situation.

Referring to FIG. 1, FIG. 2 and FIG. 3, a mirror 1 is shown held by a mirror frame 2 which is supported at one end thereof by a shaft 4 extending through the upper portions of sidewalls 3, 3' of the mirror box and in the rear of the photographic lens. At the side of said mirror frame 2 and at a short distance from its transverse axis a pin 5 is provided which projects outwardly and lies loosely within an arch channel 6 in sidewall 3, the center of curvature of channel 6 being the shaft 4 axis.

An operation lever 7 is mounted on sidewall 3 for pivotal movement at one end about a pin 8 and is disposed below arch channel 6. A connecting arm 9 is mounted at one end for pivotal movement at the other end of lever 7 by means of a pin 10. The other end of connecting arm 9 is provided with a notched slot 9a in which pin 5 projecting outwardly of the mirror frame 2 is fitted, and a spring 11 is wound about a projection 11a of arm 9 and is disposed near slot 9a so as to urge pin 5 into contact with bottom 9b of the slot.

Therefore, when mirror frame 2 is in its viewing condition of FIG. 2, its lower portion rests against stop pins 12,12' projecting inwardly from respective sidewalls 3,3'. The mirror 1 then lies at an angle of about 45° to the optical axis of the photographic lens and is maintained in this position by means of spring 11 which urges pin 5 in notched slot 9a to bottom 9b thereof so as to exert a turning force in a clockwise direction so as to allow mirror frame 2 to maintain contact with stop pins 12,12'.

In such a viewing condition, therefore, when the shutter is released operation lever 7 is moved in a clockwise direction about pin 8, toward its position shown in FIG. 3, by means of a well-known driving mechanism in the initial process prior to operation of releasing said shutter. Arm 9 interconnected with lever 7 at pin 10 is accordingly moved into a coaxial relationship with lever 7 under the guidance of pin 5. When the angle between lever 7 and arm 9 is 180°, bottom 9b of notched slot 9a comes into contact with pin 5 against the spring action of spring 11 so as to turn mirror frame 2 counterclockwise about shaft 4. And, as the angle of bend between lever 7 and connecting arm 9 approaches 180°, further rotational movement between pin 5 and the wall of slot 9a decreases to zero when lever 7 and arm 9 are coaxial. Mirror frame 2 is therefore placed in a position parallel to the optical axis of the photographic lens as shown in FIG. 3 and mirror 1 comes to contact with a finder frame, not shown in the drawings, so as to screen the outside light from coming into the camera from the finder chamber.

Therefore, any jarring of the camera as frame 2 comes in contact with the finder frame is substantially avoided by reason of spring 11 which serves to dampen such contact.

Then, after the shutter is closed, in order to move mirror 1 from its photographing condition of FIG. 3 back to its viewing condition of FIG. 2, operation lever 7 is moved counterclockwise about pin 8 by any preselected means. Accordingly, operation lever 7 and connecting arm 9 are bent with respect to each other about pin 10 and, as connecting arm 9 is lowered, spring 11 urges pin 5 toward bottom 9b of notched slot 9a so that mirror frame 2 is pivoted in a clockwise direction about shaft 4 into contact once again at its free end with stop pins 12,12' to stop at the position at an angle of 45° to the optical axis of the photographic lens. Between movement of the mirror from that of FIG. 3 to that of FIG. 2, pin 5 moves out of contact with bottom 9b of the slot against the action of spring 11 after the mirror frame contacts pins 12,12'.

According to the present invention as described above, it can be therefore seen that mirror shock caused by jarring of the mirror at the time of photographing may be avoided and the mirror held in its proper viewing position without permitting spring 11 to be in the way when the mirror is raised up during photographing.

Figure 6:
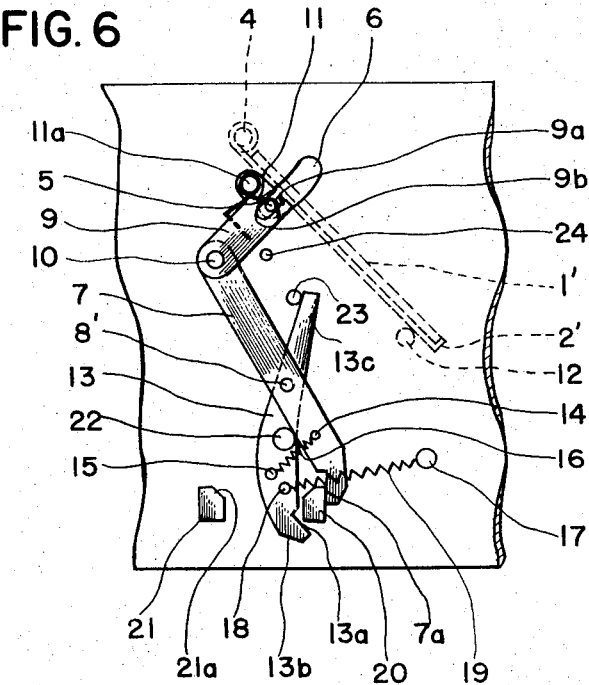
FIG. 6 is a side view similar to FIG. 4 showing the condition prior to charging the driving mechanism after the quick return mechanism is operated and returned to the viewing condition again.

Referring to FIG. 4, FIG. 5 and FIG. 6, a driving mechanism is shown for driving the moving mechanism in accordance with the present invention wherein lever 7 and a return lever 13 are pivoted about a rotatable pivot pin 8' mounted on sidewall 3 of the mirror box, a driving spring 16 extends between pins 14,15 provided respectively on said operation lever 7 and return lever 13, and a return spring 19 is provided between a pin 18 on lever 13 and a pin 17 on sidewall 3 for urging movement of lever 13 in a counterclockwise direction.

The lower end of operation lever 7 is formed with a notched root 7a so as to engage with an operation locking lever 20 which comes down in interlocking relationship with the shutter release operation member. The lower end of return lever 13 is provided with a notched root 13a so as to engage with a return locking lever 21 which comes down in interlocking relationship with the termination of the closing stroke of the shutter. Also, the lower end of lever 7 is flattened along an incline as at 7b which comes into contact with inclined plane 20a of operation locking lever 20 when operation lever 7 moves counterclockwise thereby allowing operation locking lever 20 to contact notched root 7a after inclines 7b and 20a slide over one another. In the same manner, on the back of notched root 13a of return lever 13 there is provided an inclined plane 13b which comes into contact with inclined plane 21a of return locking lever 21 when said return lever 13 moves clockwise so as to allow said return locking lever 21 to contact with said notched root 13a sliding over said inclined plane 21a.

Pin 23 provided on sidewall 3 of the mirror box is a stop pin for contacting with upper end 13c of return lever 13 so as to check against the counterclockwise turning of said driving lever 13 through over the given angle, and in the same way pin 24 provided on sidewall 3 is a stop pin for checking against the clockwise turning of operation lever 7 through over the given angle.

In the embodiment constructed described above, and in the condition thereof that charge is completed as shown in FIG. 4, notched root 7a of operation lever 7 comes into contact with operation locking lever 20 in the position turned counterclockwise and notched root 13a of return lever 13 comes into contact with return locking lever 21, therefore, driving spring 16 and return spring 19 are energized in the stretched condition and operation lever 7 and connecting arm 9 are bent to each other at pin 10, and pin 5 on mirror frame 2 is pressed in notched slot 9a on connecting arm 9 by spring 11 and also pressed in contact by stop pins 12,12' and thereby the viewing situation is held.

In this condition, when the release member is operated, in the initial stroke operation locking lever 20 comes down to disengage operation lever 7, so that said operation lever 7 is turned clockwise using pin 8' as a center through the tension of driving spring 16 and checked by stop pin 24 in the position aligned with connecting arm 9. And at the same time pin 5 is pushed up by bottom 9b of notched slot 9a and mirror frame 2 turns counterclockwise to stop in the position parallel with optical axis, and thereby the photographing situation is obtained as shown in FIG. 5.

Then, when opening and closing of the shutter is completed, in interlocking with this operation return locking lever 21 comes down to disengage notched root 13a of return lever 13 and return lever 13 is turned counterclockwise using pin 8' as a center through the tension of return spring 19, so that operation lever 7 comes into contact with pin 22 at its side edge, and is turned counterclockwise using pin 8' as a center, and accordingly inclined plane 7b thereof comes into contact with inclined plane 20a of operation locking lever 20 to press down said operation locking lever 20, and notched root 7a engages with said release locking lever 20 sliding thereover. And at the same time operation lever 7 and connecting arm 9 are bent to each other, and connecting arm 9 turns clockwise and the upper end thereof comes down, so that pin 5 on mirror frame 2 is pressed to come down by spring 11 and mirror frame 2 is turned clockwise to come into contact with stop pins 12, 12' and hereafter the position is held correctly as it is pressed by said spring 11, and holds the position shown in FIG. 6, that is, the viewing situation is obtained again.

Then, upon charging the shutter and turning return lever 13 clockwise against driving spring 16 and return spring 19, said return lever 13 presses down return locking lever 21 and slides thereover, and as shown in FIG. 4 notched root 13a engages with return locking lever 21 and the driving mechanism for the reflector is also charged.

I claim:

1. A mechanism for operating the reflecting mirror in a single-lens reflex camera comprising:
   a mirror box having a pair of spaced sidewalls;
   a mirror frame for supporting the mirror;
   a shaft extending between said sidewalls for pivotally supporting said frame and mirror at one end within said box, said frame and mirror being capable of movement between an uppermost and lowermost position about said shaft;
   a first lever pivotally mounted at one end to one of said sidewalls;
   said one wall having an arcuate slot therein;
   a pin member secured to said mirror frame and projecting outwardly of said box through said arcuate slot;
   a second lever pivotally mounted at one end to the other end of said first lever, said second lever having a slot therein opening toward the other end thereof, said pin member being received within said slot;
   a spring member mounted on said second lever and having a spring arm engaging said pin for urging it toward the bottom of said slot; and
   both said levers forming a link mechanism for said mirror frame and being disposed angularly with respect to one another in other than the uppermost position of said frame, and said levers being disposed coaxially with respect to one another in the uppermost position of said frame.

2. The mechanism according to claim 1 further including stop means on said box for determining the lowermost position of said frame, and said levers being further arranged such that, in other than the uppermost position of said frame, said pin member is slightly spaced from said bottom of said slot thereby serving to increase the residual tension of said spring after said mirror frame contacts said stop means at the lowermost position of said frame, whereby said frame is moved upwardly as the residual tension of said spring is lessened and permits said pin to be moved closer toward said slot bottom until it makes contact therewith at said uppermost position.

* * * * *